(12) United States Patent
Tuckey et al.

(10) Patent No.: US 8,037,173 B2
(45) Date of Patent: Oct. 11, 2011

(54) MESSAGE MONITOR, ANALYZER, RECORDER AND VIEWER IN A PUBLISHER-SUBSCRIBER ENVIRONMENT

(75) Inventors: David T. Tuckey, Victoria (CA); Basem Elwarry, Langford (CA)

(73) Assignee: Schneider Electric USA, Inc., Palatine, IL (US)

( * ) Notice: Subject to any disclaimer, the term of this patent is extended or adjusted under 35 U.S.C. 154(b) by 307 days.

(21) Appl. No.: 12/130,284

(22) Filed: May 30, 2008

(65) Prior Publication Data
US 2009/0300165 A1 Dec. 3, 2009

(51) Int. Cl.
*G06F 15/16* (2006.01)
*G06F 15/173* (2006.01)

(52) U.S. Cl. ......... 709/224; 709/203; 709/217; 709/223

(58) Field of Classification Search .......... 709/217–219, 709/223–226; 714/14, 22; 707/100–104.1; 713/300–340
See application file for complete search history.

(56) References Cited

U.S. PATENT DOCUMENTS

| | | | |
|---|---|---|---|
| 6,415,244 B1 * | 7/2002 | Dickens et al. | 702/187 |
| 6,598,078 B1 * | 7/2003 | Ehrlich et al. | 709/224 |
| 7,103,874 B2 * | 9/2006 | McCollum et al. | 709/224 |
| 7,558,703 B2 * | 7/2009 | Stoupis et al. | 709/223 |
| 2002/0138785 A1 | 9/2002 | Hammond et al. | |
| 2002/0173927 A1 * | 11/2002 | Vandiver | 702/122 |
| 2003/0131258 A1 * | 7/2003 | Kadri | 713/201 |
| 2004/0172207 A1 | 9/2004 | Hancock et al. | |
| 2005/0144437 A1 * | 6/2005 | Ransom et al. | 713/151 |
| 2006/0007901 A1 * | 1/2006 | Roskowski et al. | 370/338 |
| 2007/0114987 A1 | 5/2007 | Kagan | |
| 2007/0223533 A1 * | 9/2007 | Kirrmann et al. | 370/469 |
| 2008/0120080 A1 * | 5/2008 | Nasle | 703/13 |
| 2008/0215727 A1 * | 9/2008 | Denis et al. | 709/224 |

OTHER PUBLICATIONS

Analysis of Recording Elements in Wide Area Monitoring Systems by Damien Tholomier and Alexander Apostolov (downloaded from www.areva-td.com Sep. 22, 2008); 10 pages.
BiTronics M871, Single Line, Dual Bus Modular IED by Areva (downloaded from www.areva-td.com Sep. 22, 2008); 2 pages.
BiTronics M871 Monitoring and Recording IED by Areva, dated Sep. 22, 2008; 1 page.
Bitronics M87X Monitoring & Recording IED User Manual by Areva, dated Dec. 21, 2007; 126 pages.
Written Opinion corresponding to co-pending International Patent Application Serial No. PCT/US2009/045311, European Patent Office, dated Oct. 2, 2009, 6 pages.
International Search Report corresponding to co-pending International Patent Application Serial No. PCT/US2009/045311, European Patent Office, dated Oct. 2, 2009, 4 pages.
Omicron "IEC 61850—An Important Standard for the Electrical Power Industry" XP-00251152; dated 2006 (4 pages).

\* cited by examiner

*Primary Examiner* — Ian N Moore
*Assistant Examiner* — Jenee Alexander

(57) ABSTRACT

A method of performing a sequence-of-events analysis in a power monitoring system includes the acts of monitoring, receiving, analyzing, and storing. The act of monitoring includes monitoring messages published by multiple power monitors over a peer-to-peer communications network. The messages include electrical power monitoring parameters. The act of receiving includes receiving the published messages in a subscriber intelligent electronic device in the power monitoring system. The act of analyzing includes analyzing at least a portion of the received messages, performing statistical analysis and/or continuously scanning for an event of interest. The act of storing includes storing at least one record including at least one of statistical data or event of interest data.

16 Claims, 3 Drawing Sheets

MESSAGE MONITOR, ANALYZER, RECORDER AND VIEWER IN A PUBLISHER-SUBSCRIBER ENVIRONMENT

FIELD OF THE INVENTION

The present invention relates generally to a sequence-of-event analysis in a utility monitoring system having a plurality of publisher intelligent electrical devices, and in particular, to a power monitoring system having at least one subscriber intelligent electronic device.

BACKGROUND OF THE INVENTION

Utility systems, such as an electrical utility system, are monitored using a network of intelligent electronic devices ("IEDs") coupled to a workstation for monitoring various parameters of the electrical utility system. The network of IEDs and the workstation are typically referred to collectively as an electrical monitoring system. Some electrical monitoring systems operate in a peer-to-peer communications environment that uses a publisher/subscriber mechanism for exchanging messages between the IEDs. However, in these peer-to-peer communications environments there is often no means to analyze and/or store the messages being communicated between the IEDs. Further, in these peer-to-peer communications environments there is often no reliable and/or accurate method for reconstructing a sequence-of-events relating to the electrical utility system. Thus, this lack of analysis and storage in the IEDs leads to the performance of an unreliable and inaccurate sequence-of-events (SoE) analysis after an event of interest occurs in the electrical utility system.

What is needed is a way to reliably and accurately perform a sequence-of-events analysis relating to various parameters of an electrical utility system. There is also a need for an IED that can analyze and store messages communicated between IEDs in an electrical monitoring system. Aspects and embodiments disclosed herein are directed to addressing/solving these and other needs.

SUMMARY OF THE INVENTION

According to some aspects of the present concepts a method of performing a sequence-of-events analysis in a power monitoring system includes the acts of monitoring, receiving, analyzing, and storing. The act of monitoring includes monitoring messages sent by at least one publisher over a network. The act of receiving includes receiving at least one of the monitored messages. The act of analyzing includes analyzing the at least one received message and performing statistical analysis and/or scanning for an event of interest. The act of storing includes storing a first record.

According to other aspects of the present concepts, a computer readable medium encoded with instructions for performing a sequence-of-events analysis in a power monitoring system includes the instructions of monitoring, selecting, analyzing, and storing. The instruction of monitoring includes monitoring messages published by at least one publisher over a peer-to-peer network. The instruction of selecting includes selecting messages based on criteria, the criteria being one of topic-based and content-based. The instruction of analyzing includes analyzing the selected messages, performing statistical analysis and/or determining an absence or presence of an event of interest. The event of interest can be (i) a changed value detected, (ii) an appearance of new message stream detected, and (iii) a disappearance of message stream detected. The instruction of storing includes storing at least one record including at least one of statistical data and/or event of interest data.

According to other aspects of the present concepts, a method of performing a sequence-of-events analysis in a power monitoring system includes the acts of monitoring, receiving, analyzing, and storing. The act of monitoring includes monitoring messages published by multiple power monitors over a peer-to-peer communications network. The messages include electrical power monitoring parameters. The act of receiving includes receiving the published messages in a subscriber intelligent electronic device in the power monitoring system. The act of analyzing includes analyzing at least a portion of the received messages, performing statistical analysis and/or continuously scanning for an event of interest. The act of storing includes storing at least one record including at least one of statistical data or event of interest data.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
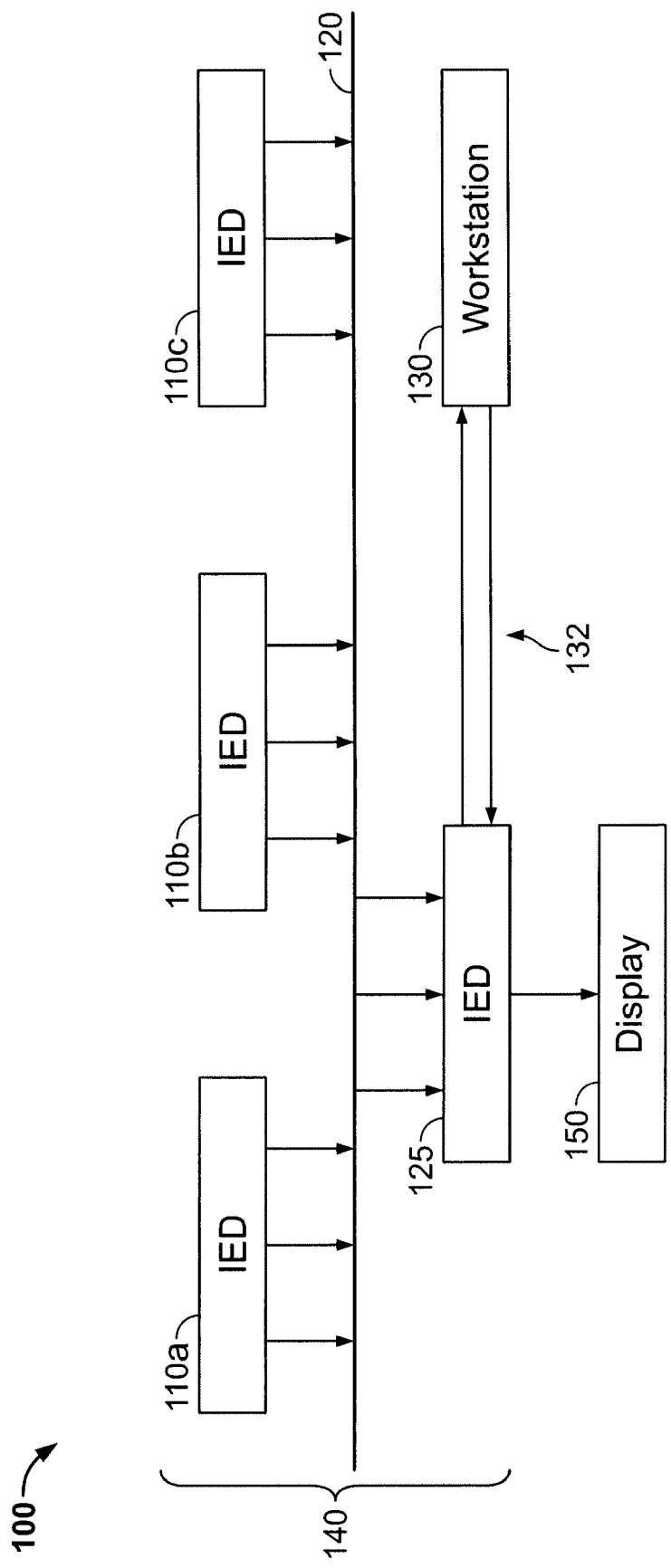
FIG. 1 is a functional block diagram of a utility monitoring system having a plurality of publisher intelligent electronic devices and a subscriber intelligent electronic device in accordance with aspects herein.

Turning now to FIG. 1, a utility monitoring system 100 is generally shown. The utility monitoring system 100 includes a plurality of intelligent electronic devices 110*a-c*, 125 (hereafter "IEDs") communicatively coupled through a network 120. The plurality of IEDs 110*a-c*, 125 can be configured to communicate in a peer-to-peer communications environment using a publisher/subscriber mechanism 140. The peer-to-peer communications are transmitted over the network 120, which can be an Ethernet network. As used herein, an IED refers to any system element or apparatus with the ability to sample, collect, or measure one or more operational characteristics or parameters of a utility system. The utility system being monitored by the utility monitoring system 100 can be any of the five utilities designated by the acronym WAGES, or water, air, gas, electricity, or steam. In the electrical utility context, the IED may be based on a PowerLogic® Series 3000/4000 Circuit Monitor or a PowerLogic® ION7550/7650 Power and Energy Meter available from Schneider Electric or any other suitable monitoring device (e.g., circuit monitor), a circuit breaker, a relay, a metering device, or a power meter.

The utility monitoring system 100 can be configured to monitor a plurality of parameters of any WAGES utility. The parameters can be power, voltage, current, current distortion, voltage distortion, energy, or any parameter associated with any WAGES utility, such as volumetric flow rates, mass flow rates, volumetric flux and mass flux. The utility monitoring system 100 can also be configured to monitor a status of an individual IED. For example, the IED 110*a* can be a microprocessor-based relay (e.g., a protective relay) that monitors the status (e.g., on or off) of a circuit breaker coupled to an electrical utility system.

The utility monitoring system 100 can also include a workstation 130 coupled to the IED 125 via a two-way connection 132. According to some aspects, the IEDs 110*a-c* publish information and the IED 125 receives at least a portion of that published information. A user of the workstation 130 can request such published information (e.g., in bulk/long format and/or in summary format) directly from the IED 125 through the two-way connection 132. However, according to some aspects, the IEDs 110*-a-c* can also generate and store a significant amount of unpublished information (e.g., monitoring data) that may still be necessary for system analysis. Thus, according to some aspects, the workstation 130 maintains a master/slave connection (not shown) with the IEDs 110*a-c*. The master/slave relationship allows the workstation user to obtain the unpublished information directly from the IEDs 110*a-c*. Typically, the user is interested in unpublished historical logs (e.g., data logs, wave form logs, and/or event logs). Similarly, the user can request unpublished real time data.

According to some aspects, the utility monitoring system 100 can also include a display 150. The display 150 is coupled to the IED 125 to provide a visual summary of the messages and/or statistical data/information.

A cycle of operation of the utility monitoring system 100 will now be discussed in accord with an example embodying aspects of the present concepts. The example illustrated in FIG. 1 relates to the publisher/subscriber mechanism 140 configured to monitor, for example, an electrical utility system. It is contemplated that the publisher/subscriber mechanism 140 can be configured to monitor any of the WAGES utilities. According to some aspects, the publisher/subscriber mechanism 140 includes a plurality of publisher IEDs (e.g., IEDs 110*a-c*), at least one subscriber IED (e.g., IED 125), and an Ethernet 120. The publisher IEDs 110*a-c* are configured to monitor a parameter of the electrical utility system and/or a status of the IED 110*a-c* itself (e.g., on or off). According to some aspects, a utility monitoring system can include a plurality of publisher IEDs and a plurality of subscriber IEDs. Further, some IEDs can be configured to both publish messages and subscribe to messages.

According to some aspects, the plurality of publisher IEDs 110*a-c* publish messages such as electronic data packets and/or frames (e.g., Ethernet frames, Point-to-point protocol frames) relating to the plurality of parameters of the electrical utility system and/or status without knowledge of what, or how many, subscribers exist. Similarly, the subscriber IED 125 subscribes to, or expresses an interest in, a certain type, class, category, and/or group of published messages without knowledge of what, or how many, publishers exist. According to some aspects, the publisher IEDs send packets to a MAC address and/or an IP address that explicitly identifies the destination of the message (e.g., multicast publishing). The subscriber IEDs can monitor for the published messages sent to a particular address of interest. For example, a publisher IED can send a packet to MAC/IP address "X" and a subscriber can monitor the MAC/IP address "X" for published packets. The decoupling of the plurality of publisher IEDs 110*a-c* and the subscriber IED 125 allows for greater scalability and a more dynamic network topology.

According to some aspects, the plurality of publisher IEDs 110*a-c* can publish messages according to a broadcast distribution strategy, also called broadcasting. Broadcasting messages refers to transmitting a message that is ideally received by every IED (e.g., IEDs 110*a-c*, 125) on the network. Specifically, broadcast packets are received by all IEDs on a given subnet of the network, whether they are interested in the packets or not. Alternatively, the plurality of publisher IEDs 110*a-c* can publish messages according to a multicast distribution strategy, also called multicasting. Multicasting messages refers to the delivery of data packets to a group of destinations simultaneously using the most efficient delivery strategy. As described above, the group of destinations can refer to a group of IEDs subscribing to a particular MAC/IP address reserved for multicast messages.

Referring to the exemplary microprocessor-based relay IED 110*a*, this IED 110*a* can be configured to control and monitor a typical circuit breaker in the power monitoring system 100. Specifically, the IED 110*a* can control current flowing through the circuit breaker by switching the circuit breaker off, thereby interrupting the flow of electricity, upon the occurrence of an event (e.g., current amperage spikes). The microprocessor-based relay IED 110*a* can also monitor the status (e.g., on or off) of the circuit breaker and publish messages containing that status. Specifically, IED 110*a* publishes data packets (e.g., bytes or bits), that represent the status of the circuit breaker, in a broadcast and/or a multicast fashion as described above. According to some aspects, the IED 110*a* is configured to intermittently publish status messages (e.g., every two minutes). Additionally, the IED 110*a* can be configured to publish bursts and/or a plurality of status messages upon a change of status (e.g., from on to off). The published status message(s) serve as a sanity check for subscriber IEDs (e.g., IED 125) in the system 100. Specifically, the messages confirm that the status has not changed and that the circuit breaker being monitored, for example, is still in the previously communicated state. The status messages are also useful information to a user of the workstation 130 and/or display 150 for diagnosing the system 100, or otherwise.

The subscriber IED 125 can be configured to monitor certain messages published by IED 110*a* according to some aspects of the present concepts. Similarly, the subscriber IED 125 can be configured to simultaneously monitor certain messages published by IEDs 110*b-c*. Specifically, the subscriber IED 125 can be configured to monitor one or more addresses (e.g., MAC address, IP address, unit address) for published messages. According to some aspects, the IEDs 110*b,c* are microprocessor-based monitoring devices such as a power monitor or a circuit monitor. The IEDs 110*b,c* can be configured, for example, to monitor voltage and/or current passing through a particular point on the electrical utility system. The IEDs 110*b,c* can also be configured to publish messages containing data representing electrical power monitoring parameters (e.g., voltage, current, change in voltage and/or current etc.) in the same or similar fashion as IED 110*a* publishes messages, described above.

According to some aspects, the subscriber IED 125 can monitor a particular address for messages and receive all of the monitored messages or a portion of the monitored messages (e.g., multicasting system). Alternatively, the subscriber IED 125 can be configured to just receive all published messages on the network without specifically monitoring (e.g., broadcasting system). The subscriber IED 125 is also configured to send all of the received messages, whether monitored or not, directly on for analysis. According to some aspects, the subscriber IED 125 can be configured to receive messages and to further filter the received messages according to criteria prior to analyzing any of the received messages. In these aspects, the subscriber IED 125 only analyzes a portion of the received messages that met the criteria.

According to some aspects, in addition to monitoring and receiving published messages, the subscriber IED 125 can be configured to filter the published messages, analyze the messages to generate statistical data and/or event of interest data, store the messages in a memory, and export the messages and/or related data (all discussed in detail below in relation to FIGS. 2 and 3). The user of the workstation 130 and/or display 150 can request for the subscriber IED 125 to export the stored messages, related statistical data, and/or event of interest data by transmitting and/or downloading, for example, the information to the workstation. Alternatively, the user can view a summary of the statistical data and/or event of interest data exported to the display 150.

The messages themselves, the statistical data derived therefrom, and/or the event of interest data can be used by the user to help reconstruct the sequence-of-events (e.g., what happened, when and how) during, for example, an electrical power failure (e.g., rolling power outage). Specifically, the information available to the user is useful when analyzing the events surrounding a rolling power outage after the fact. This post event analysis allows the user to determine whether certain IEDs acted appropriately during the electrical power failure, which may help prevent future electrical problems. The generated statistical data is also useful for monitoring system communications as an ongoing maintenance program.

Figure 2:
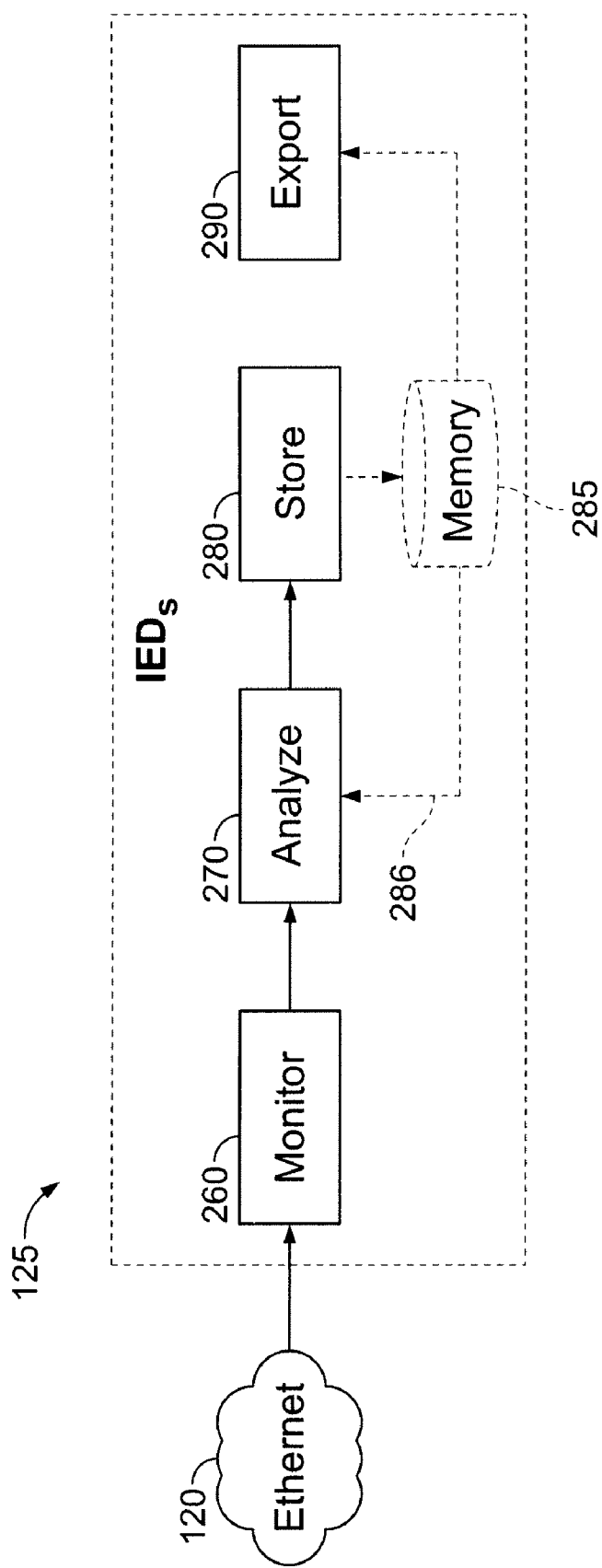
FIG. 2 is a functional block diagram of an exemplary subscriber intelligent electronic device in accordance with aspects herein.

Now referring to FIG. 2, a functional block diagram of an exemplary subscriber IED is depicted according to some aspects of the present concepts. The subscriber IED 125 can be used in performing a sequence-of-events analysis in, for example, the power monitoring system. Other types of utilities are contemplated for monitoring (e.g., WAGES). The subscriber IED 125 is coupled to the Ethernet 120. The Ethernet 120 is used to transmit messages (e.g., data packets) of various sizes, types, categories, and contents from at least one of the publisher IEDs 110a-c (FIG. 1) to the subscriber IED 125. According to some aspects, it is contemplated that the Ethernet 120 can be configured to transmit messages between the publisher IEDs 110a-c and similarly to transmit messages from the subscriber IED 125 to any of the publisher IEDs 110a-c. Thus, it is contemplated that according to certain aspects, any of the plurality of IEDs 110a-c, 125 can be configured to publish and/or subscribe to messages transmitted between any of the other plurality of IEDs 110a-c, 125 connected to, or coupled with, the Ethernet 120.

According to some aspects, the subscriber IED 125 is configured to at least (A) monitor (260) published messages, (B) analyze (270) at least a portion of the published messages, (C) store (280) the published messages and related data in a memory 285, and (D) export (290) the published messages and/or the related data from the memory 285. Specifically, the subscriber IED 125 monitors (260) messages transmitted (e.g., multicast system) over the Ethernet 120 from any connected publisher IED (e.g., IEDs 110a-c). The relationship of the subscriber IED 125 and the publisher IEDs 110a-c can be referred to as a peer-to-peer communications network/environment. Put another way, the subscriber IED 125 and the publisher IEDs 110a-c are peers that communicate messages (e.g., data packets) using the publisher/subscriber mechanism 140 described above.

According to some aspects, the subscriber IED 125 filters the received messages based on criteria. The criteria can be a packet type (e.g., IPv4, IPv6), an address of an IED (e.g., MAC address, IP address, unit/hardware address, etc.), or a packet length (e.g., bytes). For example, according to some aspects, the messages are IEC 61850 GOOSE (hereafter "GOOSE") messages; the GOOSE messages (e.g., packets) may contain embedded information (e.g., an identifier) that uniquely identifies the IED publishing the message. Specifically, the embedded information can be a MAC address and/or an IP address of the publisher IED (e.g., IED 110a) that allows the subscriber IED 125 to filter the messages according to the publisher IED's identity. According to some aspects, the subscriber IED 125 filters the GOOSE messages using a filter table to only receive messages from a MAC address of interest.

Alternatively, the messages can be filtered based on a topic or a content of the messages. For example, some GOOSE messages can contain a first topic of statistical data relating to various parameters of the electrical utility system, while other GOOSE messages can contain a second topic of status data relating to the status of, for example, the circuit breaker monitored by the microprocessor-based relay IED 110a. Thus, the subscriber IED 125 can filter the messages based on the first and second topics. Yet in some aspects, the subscriber IED 125 filters based on the type/format of message. For example, the subscriber IED 125 can be configured to only analyze GOOSE messages and filter out other types of messages.

According to some aspects, the messages (e.g., GOOSE messages) are analyzed (270) after the subscriber IED 125 filters the messages. It is contemplated that in some aspects, the subscriber IED 125 does not filter the messages such that all of the received messages are automatically analyzed (270). It is also contemplated that in some aspects, the subscriber IED 125 monitors (260) and receives particular messages and then filters those messages to determine what messages will be analyzed (270).

According to some aspects, the subscriber IED 125 analyzes (270) the messages by (A) performing statistical analysis and/or (B) scanning for an event of interest. The subscriber IED 125 performs statistical analysis on all of the received messages to generate statistical data relating to parameters of the electrical utility system. The scanning for the events of interest is also referred to as determining the absence or presence of the events of interest. Upon the determination that an event of interest exists or has occurred, the subscriber IED 125 is configured to generate event of interest data relating to the message and/or message stream being analyzed. According to some aspects, the subscriber IED 125 can continuously, periodically, intermittently, and/or upon a prompt (e.g., receipt of a new message and/or new message stream) scan for an event of interest.

The term "message stream" refers to a group of messages sent from a specific IED. For example, the microprocessor-based relay IED 110a transmits a message stream that contains a plurality of related messages regarding the status (e.g., on or off) of a circuit breaker. Similarly, the microprocessor-based power meter/power monitor IED 110b can transmit a message stream that contains a plurality of messages; each of the messages containing, for example, electrical power monitoring parameters. Once the publisher IED (e.g., IEDs 110a-c) stops sending messages, the message stream disappears.

After the subscriber IED 125 analyzes (270) a message in a particular message stream, certain statistical data, derived from statistical analysis (further discussed below in relation to FIG. 3), is stored (280) as a record in the memory 285. Specifically, the subscriber IED 125 is configured to store (280) at least one record in the memory 285. According to some aspects, the memory 285 includes a historical log memory and a buffer memory. The memory 285 can include a separate buffer memory for each message stream such that a received message for a particular message stream does not overwrite the statistical data for a different message stream.

According to some aspects, the at least one record (e.g., a first record) includes a time stamp of the time the subscriber IED 125 received the message, a copy of the message (e.g., the most recent message in a particular message stream), and resulting statistical data (e.g., at least one metadata field). Specifically, the resulting statistical data may include a metadata field for (i) a total number of messages received by the subscriber IED 125 for a particular message stream, (ii) a number of messages with changed data (e.g., increasing or decreasing current and/or voltage between one message and the next message in a particular message stream), (iii) a number of messages with unchanged data, (iv) a time of last changed data, (v) a minimum of data values (e.g., the lowest measured current for a specific message stream), (vi) a maximum of data values (e.g., the highest measured voltage for a specific message stream), (vii) an average of data values (e.g., the average of measured resistance for a specific message stream), (viii) a number of status changes (e.g., on to off or off to on), or any combination thereof in any amount of metadata fields.

According to some aspects, a record at least containing (A) statistical data derived from the statistical analysis (270) of a particular message and (B) a copy of only the last message is stored (280) in the buffer memory. The statistical data is an ongoing calculation of all messages in a particular stream of messages. The buffer memory is configured to only store (280) a single version of that ongoing statistical data calculation for the particular message stream along with the copy of the last message. Alternatively, the subscriber IED 125 may be configured with a memory that stores (280) the statistical data derived from the statistical analysis (270) of a particular messages stream along with more than just the latest copy of a message in the message stream. For example, the subscriber IED 125 may store the statistical data derived along with copies of the last 2, 3, 4, etc. messages in a particular message stream.

According to some aspects, the at least one record (e.g., a second record) includes a time stamp of the time the subscriber IED 125 received the message, a copy of the message (e.g., the most recent message in a particular message stream), and resulting event of interest data (e.g., at least one event identifier). The event of interest data being derived from the scanning for, or determining of, events of interest (270), of a particular message and/or message stream. According to some aspects, the at least one record (e.g., the second record) is stored (280) in the historical log memory. Specifically, the resulting event of interest data may include event identifiers such as (i) a change in value, (ii) an appearance of new message stream, and/or (iii) a disappearance of message stream. The subscriber IED 125 can be configured to include the time stamp data in the historical log memory for every event of interest from every message stream. According to some aspects of the present concepts, the time stamp the subscriber IED 125 embeds into the buffer memory for each statistically analyzed message and the time stamp embedded into the historical log memory for each event of interest can be a local time stamp (e.g., time the subscriber IED 125 received the message), a remote time stamp (e.g., time the publisher IED 110a-c sent the message), or a combination of both.

The historical log memory is configured to store (280) a significant amount/number of records, because, according to some aspects, all of the events of interest (from all message streams) are stored (280) in chronological order. Under conditions where the statistical data parameters/values are changing, the subscriber IED 125 may store (280) a plurality of events of interest in quick succession. Thus, an appropriately sized historical log memory is contemplated such that all of the events of interest can be saved until exported (290). However, if the subscriber IED 125 completely fills up the historical log memory to the maximum depth available, the subscriber IED 125 may either (1) start overwriting the oldest records (e.g., a circular log), or (2) stop recording the records until prompted by a user (e.g., a stop when full log).

Once the subscriber IED 125 stores the at least one record (e.g., the first record and/or the second record), the subscriber IED 125 can be configured to export the at least one record, a portion of the at least one record, or in the case of a plurality of stored records, the subscriber IED 125 can export all of or a portion of the plurality of records. The records can be exported via a communications link employing a communications protocol that facilitates the downloading of the record (s). Specifically, the record(s) (e.g., the contents of the historical log memory and the buffer memory) may be downloaded to the workstation 130 for use in, for example, a sequence-of-events analysis (FIG. 1). The downloading can be accomplished using any communications protocol (e.g., FTP or other proprietary protocols) that supports the transfer of data/information. Alternatively, the records can be exported using a device-hosted web page. The device-hosted web page can provide a summary of messages, a summary of the statistical data derived therefrom, a summary of the logged events of interest, or any combination thereof.

According to some aspects, the records can be exported to the display 150 coupled to the subscriber IED 125 (FIG. 1). It is contemplated that the display 150 can be a local display (e.g., in close proximity to the subscriber IED 125) or a remote display. In the case of a local display, the display of certain information (e.g., status messages and/or event of interest data) can be very useful in an environment where the workstation 130 is not proximate to the subscriber IED 125.

Figure 3:
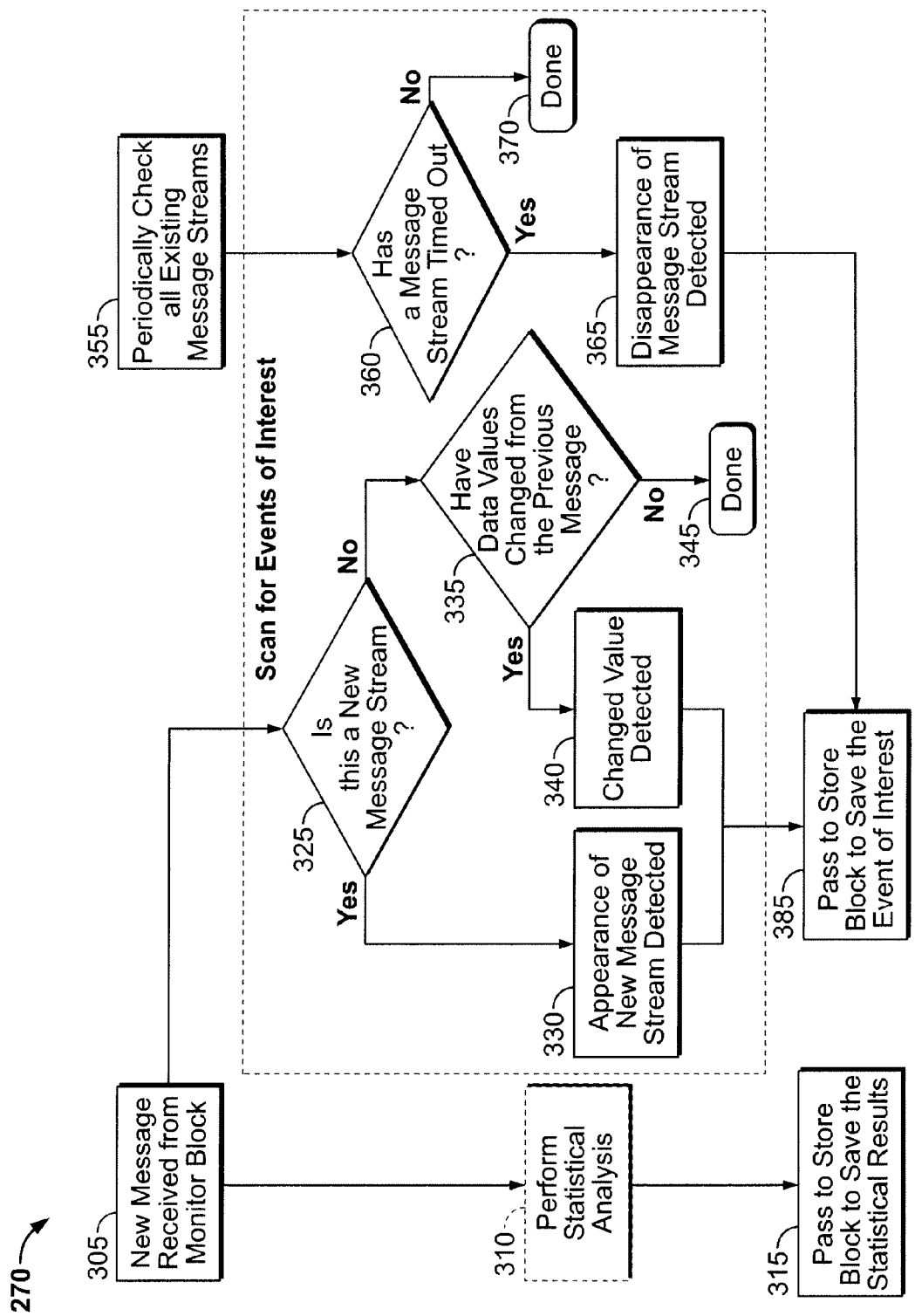
FIG. 3 is a flow chart of the analyze block of FIG. 2 in accordance with aspects herein.

Now referring to FIG. 3, a flow chart demonstrating some aspects relating to the analysis performed by the subscriber IED 125 are shown. After the subscriber IED 125 monitors (260) the messages, as described above, the messages, the message streams, or at least a portion of the messages and/or message streams, are analyzed (270). The subscriber IED 125 is configured to analyze (270) messages and/or message streams in at least one of two ways. Specifically, the subscriber IED 125 can be configured to (A) perform statistical analysis (310) and/or (B) scan for, or determine, events of interest (330, 340, and 365).

According to some aspects of the present concepts, every monitored and/or received message, as discussed above, can be statistically analyzed (270). Specifically, a new message is received in the Analyze block (305) and then the subscriber IED 125 automatically performs statistical analysis (310) on that message and/or message stream. The statistical analysis (310) generates/produces statistical data or resulting statistical data, which is passed on to the Store block (315) to be saved in the buffer memory as described above (e.g., the statistical data is stored (280)). According to some aspects, the stored (270) statistical data reflects the most recent statistics for each message stream.

The statistical analysis (310), that generates statistical data, results in determining at least one statistic relating to the message and/or message stream. Specifically, the at least one statistic can be (i) a total number of messages received in the subscriber IED 125 for a particular message stream, (ii) a number of messages with changed data (e.g., from one message to the next in a particular message stream), (iii) a number of messages with unchanged data, (iv) a time of last changed data, (v) a minimum of data values (e.g., parameter values such as current, voltage etc. over time in a particular message stream), (vi) a maximum of data values, (vii) an average of data values, (viii) a number of status changes (e.g., on/off status of IED 110a), or any combination thereof.

According to some aspects, the subscriber IED 125 scans/searches for, or determines, events of interest. Specifically, the subscriber IED 125 can scan for (i) an appearance of new message stream (330), (ii) a changed value (340), and (iii) a disappearance of message stream (365). For example, a new message is received (305) for analysis (270) and the subscriber IED 125 determines if the message is part of a new message stream (325) or part of an existing message stream. If the message is not part of, or related to, an existing message stream, then the message is the start/beginning of a new message stream. Thus, an appearance of a new message stream event of interest is detected (330) and a record can be stored in the historical log memory (385) reflecting the same, as discussed above. The appearance of a new message stream event of interest (330) may indicate that a new device (e.g., a new IED) has powered up on, or been connected to, the network, or that an existing device (e.g., IEDs 110a-c) has been reconfigured to issue a new type of message.

Assuming the new message is not the start of a new message stream, the subscriber IED 125 scans the message to determine if any of the statistical data values (e.g., current, voltage, etc.) changed as compared to the most recent message in the same message stream. Specifically, when analyzing the new message of the existing message stream, the subscriber IED 125 can be configured to retrieve a copy of the most recent message in that same stream from the memory 285. FIG. 2 depicts such a scenario where the dotted arrow 286 represents the retrieval of data from the memory 285 to the Analyze block (270) for comparison. The subscriber IED 125 then uses the stored (280) data (e.g., a copy of a previous message, previously determined statistical data and/or status data) to compare (335) with the new message to determine if an event of interest exists. Specifically, the Subscriber IED 125 determines if a changed value (340) event of interest exists by comparing (335) statistical data between the messages. If the subscriber IED 125 determines a changed value (340) event of interest exists, then an event of interest data record can be stored (280) in the historical log memory (385), as discussed above. If, however, the subscriber IED 125 determines that a changed value event of interest does not exist, then this particular inquiry is ended (345).

The detection of the changed value event of interest (340) may be achieved by explicitly examining each data value in the message, as previously discussed, or by examining a separate field in the message used to indicate whether any change occurred (if such a field is present in the message). For example, in the case of a GOOSE message, the message fields include a StNum field, a SqNum field, a Time field, and a GOOSEData array field. The StNum field includes a counter that the publisher (e.g., IED 110a-c) increments each time the published message includes a changed data value as compared to the previous message. The SqNum field includes a counter that the publisher (e.g., IED 110a-c) increments each time the publisher sends a message. The Time field includes a time stamp (based on the internal clock of the publisher) of the time when StNum was last incremented. The GOOSE-Data array field includes an array of data values associated with the utility system being monitored (e.g., parameters of the electrical system being monitored). According to some aspects of the present concepts, a changed value may be detected by comparing any of StNum, Time or GOOSEData to the previous message.

According to some aspects, the subscriber IED 125 periodically checks all existing message streams (355) to determine if they still exist or have timed-out (360). Specifically, in some publisher-subscriber environments (e.g., system 100) the publisher IED (e.g., IED 110a) is required to periodically send a new copy of the most recent message in a message stream, even if no data changes and/or status changes have occurred. This periodic resending of old messages serves to inform the subscribers (e.g., the subscriber IED 125) that the publisher is still present and operational. The IEDs (e.g., IEDs 110a-c) that publish messages are required to send a message at least once within a certain predetermined period of time. If the subscriber IED 125 receives a message on a particular message stream, and then the predetermined period of time passes without receiving another message on that message stream, then a disappearance of message stream event of interest is detected (365) and a record can be stored in the historical log memory (385) reflecting the same, as discussed above. If, however, the subscriber IED 125 determines that it has continuously received messages for a particular message stream without the predetermined period of time passing, then this particular inquiry is ended (370).

For example, in the case of a GOOSE message, each message stream must transmit a message at a minimum rate of approximately once every two minutes. The subscriber IED 125 maintains records of the most recent GOOSE messages for each message stream (as discussed above), and identifies an event of interest if more than two minutes pass without seeing a GOOSE message from each of the existing message streams. The disappearance of an existing message stream may indicate that a publishing device (e.g., IEDs 110a-c) has been removed from the network, has powered down, has been reconfigured, or has experienced a failure.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method for performing a sequence-of-events analysis in a power monitoring system that monitors an electrical utility system, the method comprising the acts of:
monitoring in a subscriber intelligent electronic device (IED) a plurality of message streams, each of the plurality of message streams being received from a respective publisher IED over a peer-to-peer communications network, each of the plurality of message streams including a plurality of messages, each of the messages including information associated with electrical characteristics of the electrical utility system measured by a respective one of the publisher IEDs;
measuring in the subscriber IED electrical characteristics of the electrical utility system;
filtering the plurality of messages streams based topic or content;

receiving one or more of the monitored plurality of message streams in the subscriber IED;

analyzing in the subscriber IED a first of the received message streams received from a first of the publisher IEDs, the analyzing including performing statistical analysis of the information associated with the electrical characteristics measured by the first publisher IED and included in the messages of the first message stream;

generating in the subscriber IED statistical data associated with the electrical characteristics measured by the first publisher IED;

scanning in the subscriber IED at least the first message stream for an event of interest, the event of interest being (i) an appearance of new message stream detected or (ii) a disappearance of message stream detected, or both;

in response to the generating, storing a first record in a buffer memory in the subscriber IED, the first record including the generated statistical data associated with the electrical characteristics measured by the first publisher IED;

in response to the scanning detecting the event of interest, storing a second record in a historical log memory in the subscriber IED, the second record including data associated with the event of interest; and transmitting the first and the second records over the peer-to-peer communications network to a workstation remote from the publisher and the subscriber IEDs for use in the sequence-of-events analysis.

2. The method of claim 1 wherein the network is an Ethernet.

3. The method of claim 1 wherein the act of monitoring occurs in a peer-to-peer communications environment using a publish/subscriber mechanism.

4. The method of claim 1 wherein the publisher IEDs transmit the message streams according to a broadcast or multicast distribution strategy.

5. The method of claim 1 wherein the sent messages are IEC 61850 GOOSE messages.

6. The method of claim 1 further comprising the act of filtering the messages based on criteria that is at least one of a type of packet, an address of a publisher, or a packet length.

7. The method of claim 1, further comprising the act of filtering in the subscriber IED the one or more received message streams in the subscriber IED to determine whether one or more of the received message streams is a message stream of interest, and in response to determining that the first of the received message streams is a message stream of interest, carrying out the act of analyzing.

8. The method of claim 1, wherein the subscriber IED is a power meter, a circuit breaker, or a relay.

9. The method of claim 1 wherein the act of performing statistical analysis includes an ongoing statistical calculation of at least one statistic relating to the first of the received message streams, the at least one statistic being (i) a total number of messages received, (ii) a number of messages with changed data, (iii) a number of messages with unchanged data, (iv) a time of last changed data, (v) a minimum of data values, (vi) a maximum of data values, (vii) an average of data values, (viii) a number of status changes, or any combination thereof.

10. The method of claim 1, wherein the second record further includes a time stamp associated with the event of interest.

11. The method of claim 1 wherein the act of storing the first record further includes the act of time-stamping the first record.

12. A non-transitory computer readable medium encoded with instructions for performing a sequence-of-events analysis in a power monitoring system that monitors an electrical utility system, the medium comprising the instructions of:

monitoring in a subscriber intelligent electronic device (IED) a plurality of message streams, each of the plurality of message streams being published by a respective publisher IED over a peer-to-peer communications network, each of the plurality of message streams including a plurality of messages, each of the messages including information associated with electrical characteristics of the electrical utility system measured by a respective one of the publisher IEDs;

measuring in the subscriber IED electrical characteristics of the electrical utility system;

selecting in the subscriber IED one or more of the message streams based on criteria, the criteria being one of topic-based and content-based;

in response to selecting a first of the message streams received from a first of the publisher IEDs, analyzing the selected message stream, the instruction of analyzing including performing statistical analysis of the information associated with the electrical characteristics measured by the first publisher IED and included in one or more of the messages of the first of the message streams;

the instruction of analyzing including determining an absence or presence of an event of interest, the event of interest being (i) an appearance of new message stream detected, or (ii) a disappearance of message stream detected, or both;

in response to analyzing the first of the message streams, storing a first record in a buffer memory in the subscriber IED, the first record including an ongoing statistical calculation associated with the first of the message streams;

in response to determining an absence or presence of an event of interest, storing a second record in a historical log memory in the subscriber IED, the second record including data associated with an event of interest; and transmitting the first and the second records over the peer-to-peer communications network to a workstation remote from the publisher and the subscriber IEDs for use in the sequence-of-events analysis.

13. A method for performing a sequence-of-events analysis in a power monitoring system that monitors and electrical utility system, the method comprising the acts of:

monitoring in a subscriber intelligent electronic device (IED) a plurality of message streams, each of the plurality of message streams being received from a respective power monitor over a peer-to-peer communications network, each of the plurality of message streams including a plurality of messages, each of the messages including information associated with electrical characteristics of the electrical utility system measured by a respective one of the power monitors;

measuring in the subscriber IED electrical characteristics of the electrical utility system;

receiving the published message streams in the subscriber IED in the power monitoring system;

selecting in the subscriber IED one or more of the received message streams based on criteria, the criteria being topic-based or content-based;

analyzing in the subscriber IED at least a portion of the selected published message streams, the analyzing including performing statistical analysis of the information associated with the electrical characteristics measured by at least a portion of the power monitors and included in one or more of the messages of the at least a portion of the selected published message streams;

generating in the subscriber IED statistical data associated with the electrical characteristics measured by the at least a portion of the power monitors;

continuously scanning in the subscriber IED for an event of interest, the event of interest (i) an appearance of new message stream detected, (ii) a disappearance of message stream detected, or both;

storing at least one record including at least one of (i) the generated statistical data associated with the electrical characteristics measured by the at least a portion of the power monitors or (ii) data associated with the event of interest; and transmitting the at least one record over the peer-to-peer communications network for use in the sequence-of-events analysis.

14. The method of claim 13 wherein the stored record includes a local time-stamp.

15. The method of claim 13 wherein the performing statistical analysis includes an ongoing statistical calculation of at least one of (i) a total number of messages received, (ii) a number of messages with changed data, (iii) a number of messages with unchanged data, (iv) a time of last changed data, (v) a minimum of data values, (vi) a maximum of data values, (vii) an average of data values, and (viii) a number of status changes, or any combination thereof.

16. The method of claim 13, wherein the at least one record is transmitted to a workstation for use in the sequence-of-events analysis.

* * * * *